(12) United States Patent
Barrera (10) Patent No.: US 6,196,273 B1
(45) Date of Patent: Mar. 6, 2001

(54) METHOD AND APPARATUS FOR FORMING A MULTI-LOBED WINDING FOR THE STATOR OF AN ALTERNATOR

(75) Inventor: Giorgio Barrera, Turin (IT)

(73) Assignee: Polytool Srl, Turin (IT)

( * ) Notice: Subject to any disclaimer, the term of this patent is extended or adjusted under 35 U.S.C. 154(b) by 0 days.

(21) Appl. No.: 09/443,941

(22) Filed: Nov. 19, 1999

Related U.S. Application Data (63) Continuation of application No. 09/204,869, filed on Dec. 3, 1998, now Pat. No. 6,019,141, which is a continuation of application No. 08/970,480, filed on Nov. 14, 1997, now Pat. No. 5,881,778.

(30) Foreign Application Priority Data

Mar. 18, 1997 (IT) ................................................ T097A0220
Apr. 30, 1997 (IT) ................................................ T097A0376

(51) Int. Cl.⁷ ..................................................... B21F 3/00
(52) U.S. Cl. ............................................................. 140/92.2
(58) Field of Search ............................................... 140/92.2

(56) References Cited

U.S. PATENT DOCUMENTS

| | | |
|---|---|---|
| 4,217,938 | 8/1980 | Barrett et al. . |
| 4,351,102 | 9/1982 | Gorzinger et al. . |
| 4,399,843 | 8/1983 | Sedgewick . |
| 4,402,129 | 9/1983 | Kreuzer et al. . |
| 4,512,376 | 4/1985 | Barrera . |
| 4,680,857 | 7/1987 | Lintott . |
| 4,847,982 | 7/1989 | Morrill . |
| 4,857,787 | 8/1989 | Taji et al. . |
| 5,197,180 | 3/1993 | Mihalko . |
| 5,316,227 | * 5/1994 | Oohashi et al. ............... 140/92.2 |
| 5,372,165 | 12/1994 | Leame . |
| 5,406,987 | 4/1995 | Gassner et al. . |
| 5,492,154 | 2/1996 | Napierski . |
| 5,709,251 | 1/1998 | Leame . |

FOREIGN PATENT DOCUMENTS 2 160 797    1/1986  (GB) .

* cited by examiner

Primary Examiner—Lowell A. Larson
(74) Attorney, Agent, or Firm—Fish & Neave; Garry J. Tuma (57) ABSTRACT

A method and apparatus are provided for forming a multi-lobed winding for the stator of an alternator, particularly for use in the automotive field and of the type comprising turns defining a star-shaped configuration having a plurality of radial lobes alternated with hollows.

11 Claims, 8 Drawing Sheets

METHOD AND APPARATUS FOR FORMING A MULTI-LOBED WINDING FOR THE STATOR OF AN ALTERNATOR

CROSS REFERENCE TO RELATED APPLICATIONS

This is a continuation of copending, commonly assigned U.S. Patent Application Ser. No. 09/204,869, filed Dec. 3, 1998, now U.S. Pat. No. 6,019,141, which was a continuation of U.S. Patent Application Ser. No. 08/970,480, filed Nov. 14, 1997, now U.S. Pat. No. 5,881,778, and which is hereby incorporated by reference in its entirety.

BACKGROUND OF THE INVENTION

The present invention relates to a method and an apparatus for forming a multi-lobed winding for the stator of an alternator, particularly for use in the automotive field and of the type comprising turns defining a star-shaped configuration having a plurality of radial lobes alternated with hollows.

A method and an apparatus for forming a multi-lobed winding for the stator of an alternator are disclosed, for example, in Italian patent 1,157,040, corresponding to Barrera, Apparatus For Forming Stator Coils Of Dynamo Electric Machines, U.S. Pat. No. 4,512,376, both of which are incorporated herein by reference.

Typically, in the case of a three-phase alternator for automotive use, each stator is provided with a winding including three multi-lobed coils angularly shifted relative to each other. The coils are formed at different stages by the forming machine, and each coil has two wire terminal ends. Each of the three multi-lobed coils constituting one of the three phases of the winding is split into two semi-coils or semi-phases which are angularly shifted relative to each other by one lobe, so that the lobes of one semi-phase are opposite to the hollows between the lobes of the other semi-phase.

According to the prior art, the two semi-phases of each coil are made by the forming machine at two subsequent stages by cutting the supplied wire between one forming stage and the other, so that each semi-phase of the three winding phases in the finished winding inserted into the stator has a pair of terminal ends. This results in a total of twelve terminal ends.

A stator winding of undulatory type with a single continuous wire, including two multi-lobed coils shifted relative to each other by one lobe, has already been proposed. (See, for example, Taji et al., Armature Of A.C. Generator For A Car And Method Of Manufacturing The Same, U.S. Pat. No. 4,857,787 and parallel European patent 209,091, both of which are incorporated herein by reference). This method initially involves forming a single multi-lobed coil which is then split into two coils, without cutting the wire portion connecting them, one of the coils being overlapped on the other in an overturned position. This additional operation involves wasted time and a resulting decrease in the productivity of the machine.

In view of the foregoing, it would be desirable to provide a method and apparatus in which the final required configuration of the winding is obtained without additional operations after winding the wire by an apparatus which requires very small changes with respect, for example, to the apparatus taught in Italian patent 1,157,040 and corresponding U.S. Pat. No. 4,512,376.

It would also be desirable to provide a method and an apparatus for forming a multi-lobed winding for the stator of an alternator which enable the two semi-phases of each winding phase to be made continuously, without cutting the wire at the end of the forming operation of the first semi-phase, so as to simplify the operations which are necessary for forming the winding, as well as to obtain a finished winding with a lower number of terminal ends.

It would also be desirable to provide a method and an apparatus by which multi-lobed windings constituted by a plurality of coaxial superimposed multi-lobed coils having their lobes angularly shifted relative to each other can be obtained continuously.

SUMMARY OF THE INVENTION

It is an object of the present invention to provide a method and apparatus in which the final required configuration of the winding is obtained without additional operations after winding the wire by an apparatus which requires very small changes with respect, for example, to the apparatus taught in Italian patent 1,157,040 and corresponding U.S. Pat. No. 4,512,376.

It is also an object of the present invention to provide a method and an apparatus for forming a multi-lobed winding for the stator of an alternator which enable the two semi-phases of each winding phase to be made continuously, without cutting the wire at the end of the forming operation of the first semi-phase, so as to simplify the operations which are necessary for forming the winding as well as to obtain a finished winding with a lower number of terminal ends.

It is yet another object of the present invention to provide a method and an apparatus by which multi-lobed windings constituted by a plurality of coaxial superimposed multi-lobed coils having their lobes angularly shifted relative to each other can be obtained continuously.

These and other objects and advantages of the invention are accomplished by forming a multi-lobed winding for the stator of an alternator. In a first stage, a first multi-lobed coil is formed, by winding a continuously fed wire in a first direction. In a second stage a second multi-lobed coil, axially superimposed to the first coil, is formed, without cutting the wire being fed, by winding the wire in the opposite direction and arranging the second coil at a position angularly shifted relative to the first coil. The second coil has its lobes at the same angular positions of the hollows of the first coil. The wire portion connecting the two coils is bent where the wire reverses its winding direction so as to form a loop, following an annular path matching the profile of a lobe of one of the two coils for one part and the profile of a hollow of the other coil opposite to the lobe for another part.

The invention thus provides a multi-lobed winding for the stator of an alternator, particularly for use in the automotive field and of the type comprising turns defining a star-shaped configuration having a plurality of radial lobes alternated with hollows.

The invention also provides a winding comprising two coaxial superimposed multi-lobed coils with lobes angularly shifted relative to each other. There is no interruption of the wire constituting the winding and, therefore, the winding has only two terminal ends. Thus, the method and the apparatus according to the invention simplify the forming operation as well as provide a stator winding with a number of terminal ends reduced by a factor of two.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
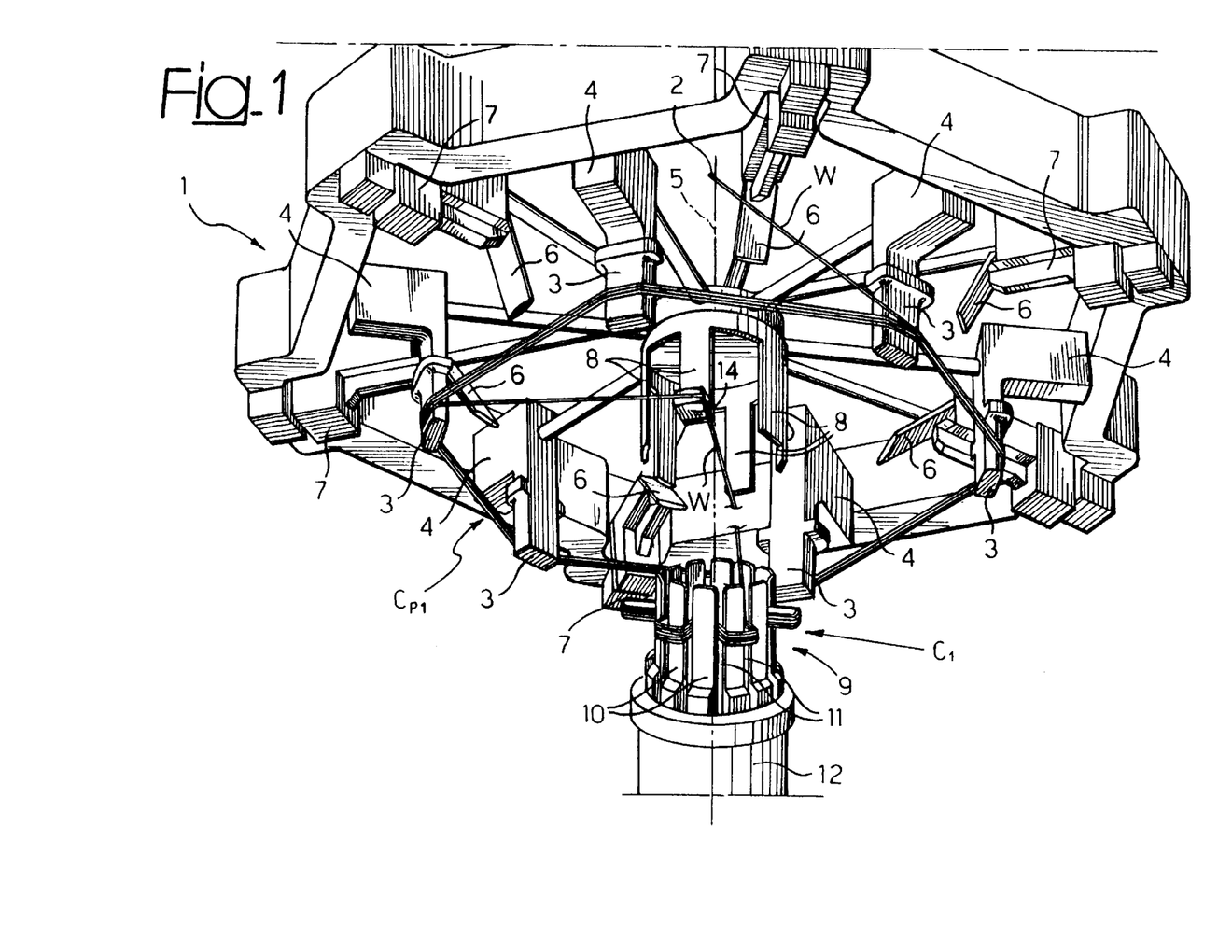
FIG. 1 is a perspective view from below of a rotating unit forming part of a preferred embodiment of the apparatus according to the invention, where the device for receiving the multi-lobed coils formed on the rotating unit is also shown in a perspective view from above, the receiving device also functioning, according to a known technique, as a device for inserting the multi-lobed coils into the slots of a stator of an alternator at a subsequent stage.

With reference to FIG. 1, numeral 1 designates the rotating unit of a machine for forming multi-lobed coils which are to be inserted into the slots of a stator of a three-phase alternator for automotive use. The machine comprising rotating unit 1 is of the general type described in, for example, Italian patent 1,157,040 and parallel U.S. Pat. No. 4,512,376. Therefore, a detailed description of the general structure of the machine is not repeated herein, since it is illustrated in the above identified patents.

In a way similar to that practiced in the prior art, the rotating unit 1 is used in order to wind thereon a wire W fed by a wire feeding device (not shown in FIG. 1) which has a delivery tube 2 outlet mouth at the area indicated by 2 in FIG. 1.

Figure 2:
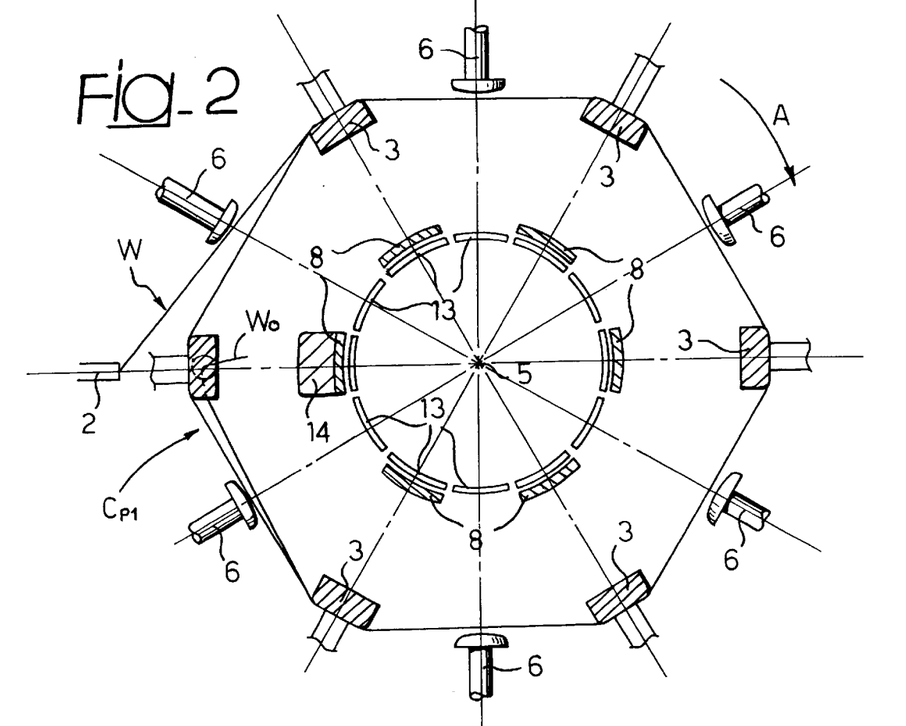
FIGS. 2–6 are diagrammatic plan views of the different forming stages of the multi-lobed winding, according to the invention.

The rotating unit 1 carries six forming elements 3 on which the wire fed from delivery tube 2 outlet mouth is wound, as a result of the rotation of rotating unit 1, so as to form an hexagonal coil $C_{P1}$ (see also FIG. 2). One of the forming elements 3 is provided with a clamp to hold the starting end $W_O$ of the wire.

The forming elements 3 are carried by slides 4 which are radially slidably mounted relative to axis 5 of rotation of unit 1. The forming elements 3 are positioned between a first radially outer end position (shown in FIGS. 1 and 2) and a second radially inner end position (shown in FIG. 3).

In the first stage of the forming method, the forming elements 3 are at their outer positions (FIG. 2) so as to enable, as already indicated, a hexagonal coil $C_{P1}$ having a relatively large diameter to be formed, as shown in FIG. 2.

The machine according to the invention has six pushing members 6 included on the rotating unit 1 and radially movable relative to the axis of rotation 5 to push radially inwardly the central parts of the sides of the hexagonal coil formed in the first stage of the method (FIG. 2). Therefore, pushing members 6 are also carried by slides, designated by 7 in FIG. 1, which are slidably mounted on radial guides carried by the rotating unit 1.

Figure 3:
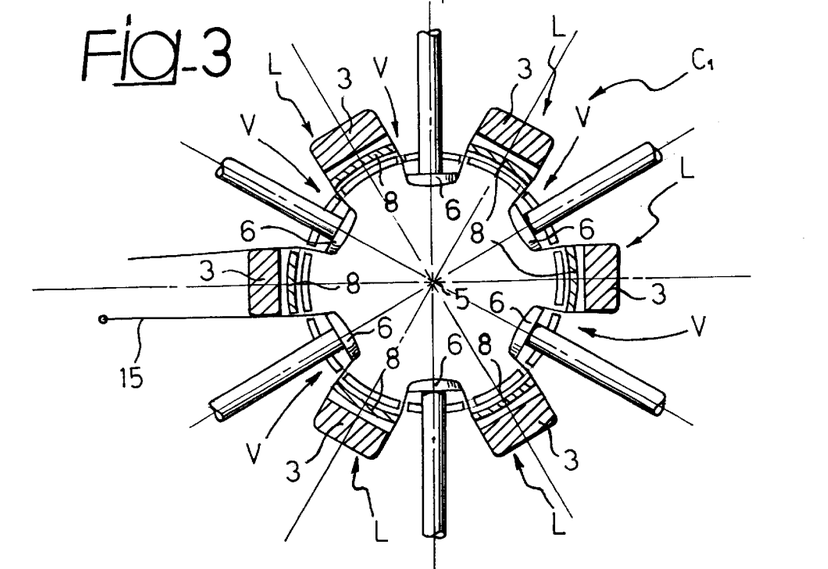

When the hexagonal coil $C_{P1}$ has been formed with the required number of turns, the rotating unit 1 is stopped and the pushing members 6 are moved towards the radially inner position shown in FIG. 3, so as to engage the sides of the polygonal coils $C_{P1}$, transforming the latter into a multi-lobed or star-shaped coil $C_1$ (FIG. 3). During this operation, the forming elements 3 also move radially inwardly while providing some resistance to the tension exerted by the wire of the coil as a result of the pressure applied by pushing members 6. According to the prior art, this resistance is obtained by connecting the forming elements 3 by flexible metal cables to a fluid cylinder having a chamber which decreases in volume during the radial inward movement of the forming elements 3 and which is connected to a discharge reservoir through a throttled passage. Since these details of construction are known from the above mentioned patents, they are not repeated herein. However, it is clear that any other device of known type adapted to provide the above mentioned effect of controlled yielding of the forming elements 3 may be used.

With reference to FIGS. 1–3, rotating unit 1 is also provided with a circumferential set of six flat fingers 8 which are at angular positions corresponding to the forming elements 3. The elements 8 are carried by the rotating unit 1 and are in radially fixed positions relative thereto, in contrast to forming elements 3 and pushing members 6. As shown in FIGS. 2 and 3, elements 8 are located at a radially inner position adjacent the innermost radial position of the respective forming elements 3. Therefore, during the shaping operation of the coil $C_{P1}$, which provides the multi-lobed coil $C_1$, the elements 8 constitute a further reference for the width of each lobe L of the multi-lobed coil $C_1$.

As taught in the art, a device 9 is provided under rotating unit 1 for receiving the multi-lobed coils after they have been formed and for inserting them (in a subsequent stage of operation not shown in the drawings) into the slots of a stator of an alternator. The inserting device 9 comprises a circumferential set of twelve blades 10 separated by longitudinal slots 11 and carried by a supporting structure 12 which can be rotated around the axis of rotation 5 by an electric motor (not shown). The electric motor and the associated transmission for rotating unit 1 and inserting device 9 are not shown herein in detail since they are similar to what is provided in the prior art.

It is to be noted that in FIG. 1, for convenience of illustration, the inserting device 9 has been shown at a position axially spaced apart from rotating unit 1, whereas they are positioned immediately vertically in practice.

As already described, the rotating unit 1 is stopped and the pushing members 6 are caused to advance to form the multi-lobed coil $C_1$ after forming polygonal coil $C_{P1}$ (FIG. 2). At this time, this multi-lobed coil $C_1$ is discharged from the rotating unit 1 over inserting device 9 by a coil removing device of conventional type carried by rotating unit 1 and adapted to be lowered axially from a retracted position up to a position in which it engages the multi-lobed coil $C_1$ and pushes this coil downwardly making it slide from the forming elements 3 and causing the radial portions of the coil to be inserted into the slots 11, so that the lobes L and the hollows V between the lobes of the multi-lobed coil $C_1$ are located alternatively at the outside and the inside of the circumferential set of blades 10, as shown in FIG. 1. In FIG. 1, the coil removing device is not shown, since it is in its raised position, retracted inside the rotating unit 1. This coil removing device comprises, according to the prior art, a circumferential set of blades 13 (see FIG. 2) extending downwardly from an upper ring, similar to what is shown in FIG. 1 for elements 8. As a result of its lowering movement, the coil removing device starts with its base ring in engagement with the radial portions of the multi-lobed coil $C_1$ and pushes this coil downwardly, causing it to slip out of the forming elements 3 and into slots 11 of the inserting device 9, as shown in FIG. 1.

In the conventional machine, either immediately before or immediately after discharging the multi-lobed coil $C_1$ on the inserting device 9, the wire being fed is cut, so that the coil arranged on the inserting device 9 has two terminal ends. Therefore, in the method according to the prior art, the rotating unit may be rotated again to provide a second multi-lobed coil which is then discharged onto the inserting device 9 at an angularly shifted position, so as to obtain, for example, the two semi-phases of a phase of the winding, with a total of four terminal ends.

Figure 4:
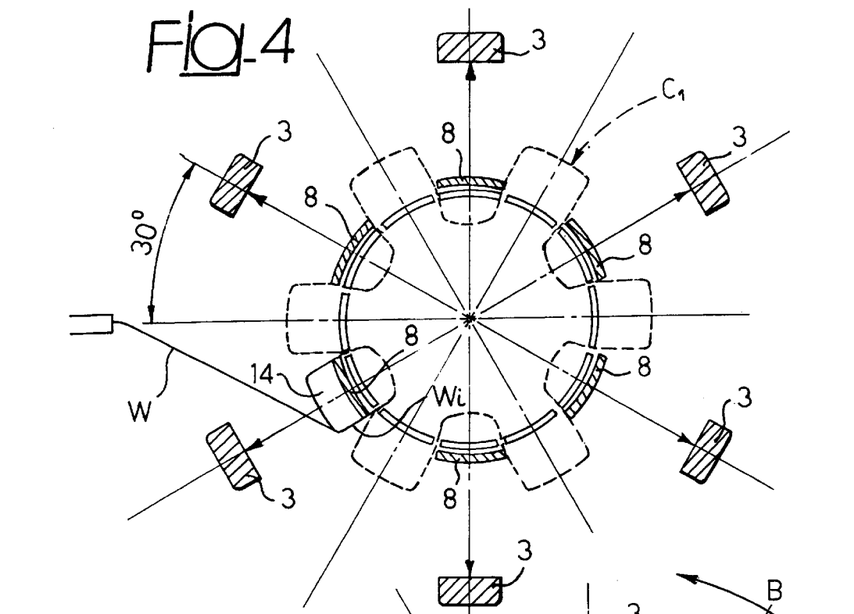
Figure 5:
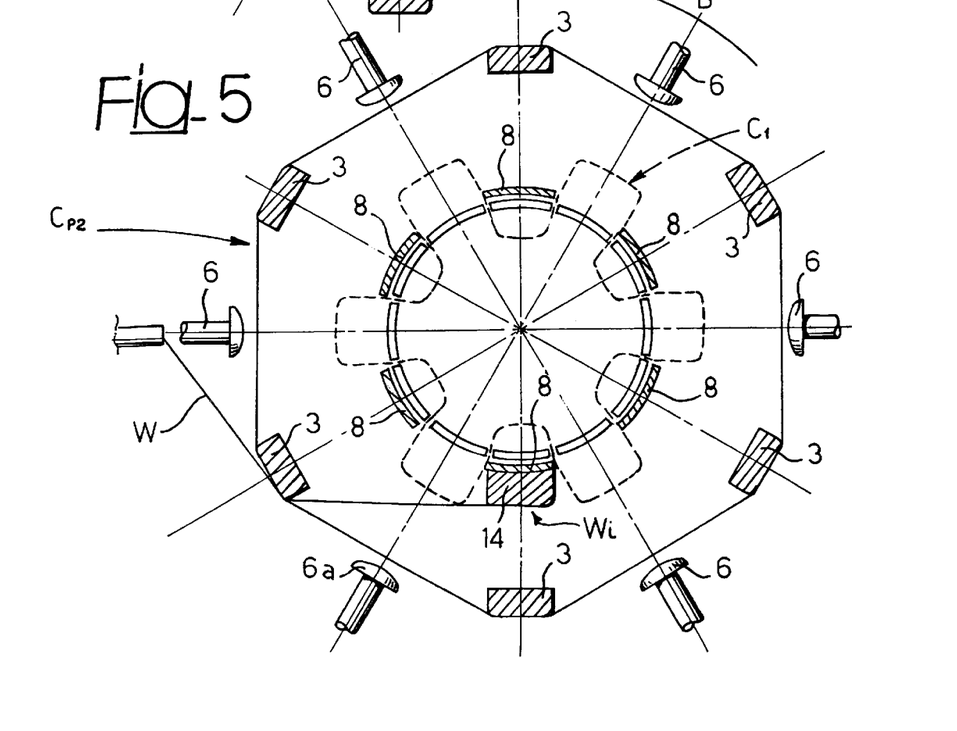
Figure 6:
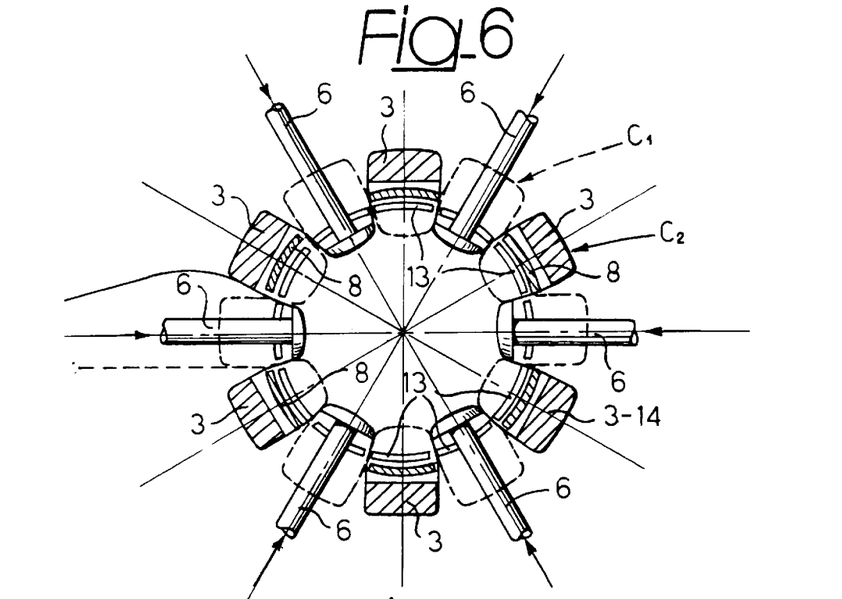

In contrast to the prior art, according to the present invention, after the first multi-lobed coil $C_1$ has been discharged on the inserting device 9, the wire being fed is not cut and the forming of a new polygonal coil is instead initiated by rotating the rotating unit 1 in a direction of rotation opposite to that of the previous forming stage, as shown in FIGS. 4 and 5. Specifically, in the forming stage shown in FIG. 2, the rotating unit is rotated in the direction indicated by arrow A in FIG. 2. In the forming stage shown in FIG. 5, the rotating unit is rotated in the opposite direction B, i.e. in an anti-clockwise direction.

Naturally, since the wire portion which connects the previously formed multi-lobed coil $C_1$ (located on the inserting device 9) to the polygonal coil $C_{P1}$ (which is being formed during the stage shown in FIG. 5, corresponding as well to the condition shown in FIG. 1) is not interrupted, it is necessary that the inserting device 9 is also rotated at the same speed during the rotation of rotating unit 1 during the second forming stage, so that the rotating unit 1 and the inserting device 9 always remain at the same relative positions. This is done preferably by controlling the electric motors which drive the rotating unit 1 and the inserting device 9 in synchronism with each other. Alternatively, a releasable mechanical coupling between the rotating unit 1 and the inserting device 9 may be provided, thereby allowing the same motor to be used to drive the rotating unit 1 and rotate the inserting device 9. For example, the releasable connection may be provided by the coil removing device, which (in this embodiment) is able to engage the inserting device 9 when in lowered position to connect this device to unit 1.

An important feature of the present invention is that the rotating unit 1 is angularly displaced so as to locate it at an angular position shifted by one lobe relative to the position of the first multi-lobed coil $C_1$ (which is in a stationary position on the inserting device 9) before activating the forming stage of the second polygonal coil $C_{P1}$ by rotating in the opposite direction unit 1 and simultaneously rotating the inserting device 9. This condition is shown in FIG. 4, where the multi-lobed coil $C_1$ (which has been already discharged on the inserting device 9) is shown with dotted lines. The forming elements 3 and the flat fingers 8 are at angular positions shifted by 30° relative to the first multi-lobed coil $C_1$, so that each forming element 3 is at an angular position corresponding for that of a hollow between adjacent lobes of the first multi-lobed coil $C_1$ already discharged on the inserting device 9.

A further feature which distinguishes the invention from the prior art, lies in that on one of the flat fingers 8 there is fixed an auxiliary wire engaging element 14 (see FIGS. 1 and 4) which is carried by unit 1 and is coupled thereto at a radially fixed position. Specifically, the wire engaging element 14 is at a radial position corresponding to the radial position of the lobes of the coil. In particular, wire engaging element 14 has an outer profile substantially corresponding to the profile of a lobe. Furthermore, the wire engaging element 14 is positioned such that after the previously formed first multi-lobed coil $C_1$ has been discharged on the inserting device 9, the wire portion $W_i$ connecting coil $C_1$ (positioned on the inserting device 9) to the wire feeding delivery tube 2 outlet mouth is intercepted by the wire engaging element 14 when the rotating unit 1 is rotated in an anti-clockwise direction (with reference to FIG. 5) in order to form a second coil.

Figure 7:
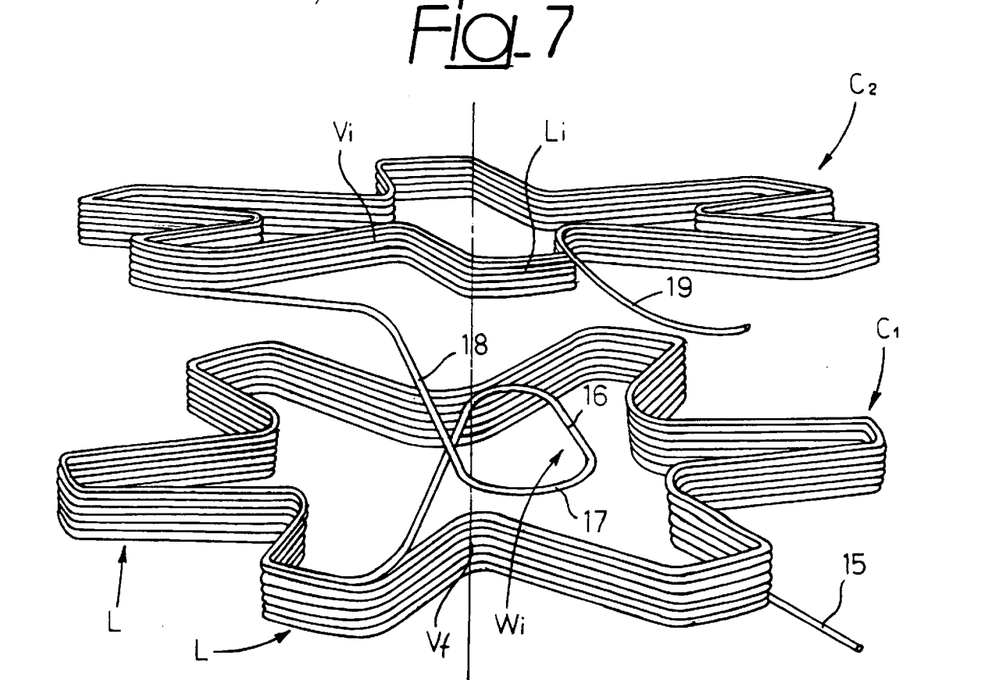
FIG. 7 is a perspective view of a multi-lobed coil comprising two semi-phases angularly shifted relative to each other, obtained according to the invention, which has been shown in a deformed condition in order to more clearly show the wire portion connecting the two semi-phases.
Figure 8:
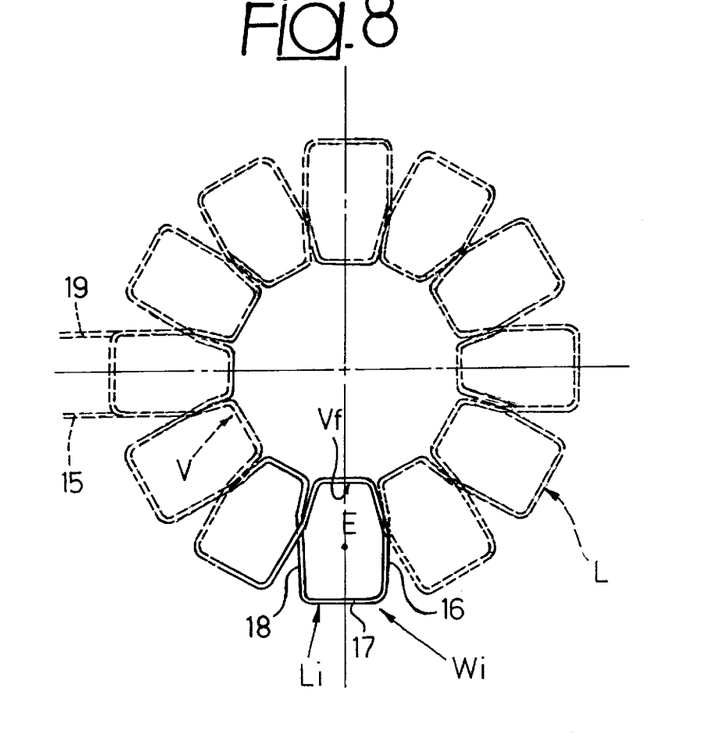
FIG. 8 is a plan view of the coil of FIG. 7.

Therefore, the wire portion connecting the first multi-lobed coil $C_1$ to the polygonal coil $C_P$ being formed is intercepted by the wire engaging element 14 during the formation of the second polygonal coil $C_{P2}$, as shown in FIGS. 1, 4 and 5. With reference to FIG. 1, it is also to be noted that the inserting device 9 has been shown in a condition spaced axially from the rotating unit 1 for the sake of clarity. Actually, the inserting device is located immediately below the rotating unit, so that the intermediate wire portion $W_i$ has a length much smaller than that shown in this figure. As shown in FIGS. 7 and 8, the first multi-lobed coil $C_1$ has a starting terminal end 15 and a final terminal end 16 projecting from a hollow $V_f$ of the multi-lobed coil $C_1$. The terminal end 16 extends radially and is curved into a portion 17 (FIGS. 7 and 8) as a result of the wire W being intercepted by the wire engaging element 14 after rotating unit 1 starts rotating in the opposite direction (see FIGS. 1 and 5).

When the second polygonal coil $C_{P2}$ has been formed (FIGS. 1 and 5) the rotating unit 1 is again stopped and the pushing members 6 are again driven to push against the sides of the polygonal coil $C_P$, thereby transforming the latter into a second multilobed coil $C_2$. In this stage, the wire portion $W_i$ projecting from the wire engaging element 14 is intercepted by one of the pushing members 6a, causing it to bend into a portion 18 (FIGS. 7 and 8) directed radially inwardly. Therefore, with reference to FIGS. 7 and 8, the wire portion $W_i$ connecting the first multi-lobed coil $C_1$ to the second multi-lobed coil $C_2$ (which is angularly offset by one lobe relative to coil $C_1$) is bent to form a loop E (FIGS. 7 and 8) where the wire reverses its winding direction, with a portion following the profile of hollow $V_f$ of coil $C_1$ and a portion following the profile of a lobe $L_i$ of the multi-lobed coil $C_2$. This means that the two multi-lobed coils $C_1$ and $C_2$ are obtained without cutting the wire, and without the intermediate wire portion $W_i$ having redundant portions which might cause difficulties during the following stage of insertion of the winding into the slots of a stator. The winding obtained thereby has a single starting end 15 and a single final end 19. As indicated above, it should be noted that in FIG. 7, the intermediate wire portion $W_i$ which is shaped into a loop has been shown in a deformed condition, with the two coils $C_1$ and $C_2$ axially spaced apart from each other, in order to show the loop configuration clearly. Actually, in the finally obtained winding, the two multi-lobed coils $C_1$ and $C_2$ are located immediately above each other with the intermediate loop portion $W_i$ lying substantially in a plane (FIG. 8).

Following the formation of the second multi-lobed coil $C_2$, the latter is naturally discharged on the inserting device 9 by the blades of the coil removing tool 13, similar to the first coil $C_1$.

In this manner, the winding obtained thereby and discharged on the inserting device 9 has two semi-phases $C_1$ and $C_2$ angularly shifted relative to each other by one lobe, which are obtained without interrupting the wire and with two single terminal ends 15, 19.

According to the conventional art, once the inserting tool 9 has received the finished winding, it is positioned at an inserting station, where a stator is preliminarily arranged for insertion of the winding. Typically, this is made in a machine with a rotating platform, carrying two inserting devices 9 which are located at diametrically opposite positions so that they can be brought alternatively, by a 180° rotation of the rotating platform, at the two diametrically opposite stations, one of which is used for forming the winding and discharging the winding on the inserting device, the other station being a station for inserting the winding into a stator. Therefore, an inserting device receives a new winding while at the forming station, at the diametrically opposite station another inserting device carrying a previously formed winding provides for the insertion of this winding into a stator. When this operation is completed, the rotating structure is rotated by 180°, so as to arrange the inserting device which has previously inserted the winding into a stator at the forming station, where it is ready to receive a new winding, whereas the inserting device which has previously received a new winding provides for insertion thereof into another stator. These details of construction are not shown in the drawings since, as previously indicated, they are known to the art.

Figure 9:
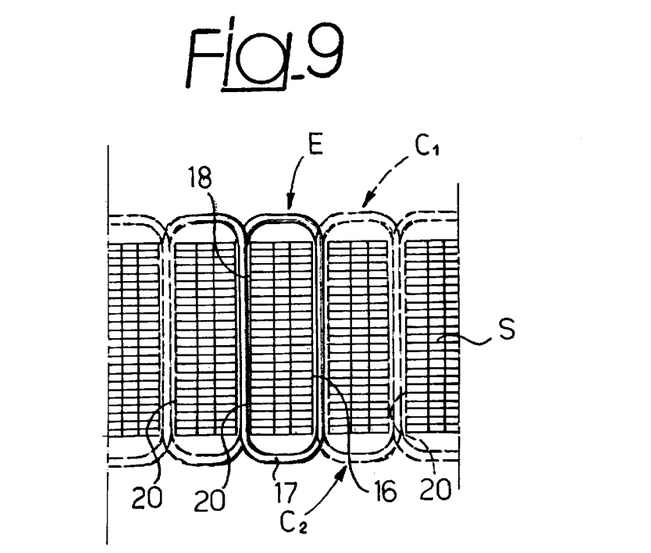
FIG. 9 is a diagrammatic view of a winding obtained by the invention inserted into the slots of a stator of an alternator.

FIG. 9 is a diagrammatic partial view of the inner cylindrical surface of a stator S having axial slots 20 for receiving radial portions of the multi-lobed coils constituting the winding. In this figure, as in FIG. 8, the winding is shown in dotted lines, with the exception of the wire portion forming the loop E where the wire reverses its winding direction. As shown in FIG. 8, the loop E follows an annular path which for one portion overlaps one lobe of a coil and another portion overlaps a hollow of the other coil opposite to the lobe. Therefore, in the inserting stage of the winding into stator S, the loop E does not cause any problems, since its portions 16, 18 may be received into two slots 20 of stator S (FIG. 9).

In the embodiment disclosed in FIGS. 1–9, the rotating unit includes a wire engaging element situated at a fixed position on the rotating unit. The position is chosen in such a way that the wire engaging element intercepts the feeding wire when the rotation of the unit is reversed in order to form the loop.

In order to further improve the previously proposed apparatus, another embodiment provides an apparatus having all the features indicated above, including the wire engaging element 14. However, the wire engaging element 14 is not located at a fixed position on the rotating unit 1, but is connected instead to one of the forming elements 3 for forming the polygonal coil with which the rotating unit is provided. That forming element is movable in a radial direction relative to the rotating unit.

Tests have shown that by providing the wire engaging element on one of the forming elements which are radially movable relative to the rotating unit and are displaced towards the axis of rotation of this unit during the operation giving a star-like shape to the initially polygonal coil, it is ensured that a winding of a high quality is obtained, particularly at the loop, where the wire reverses its winding direction.

In particular, tests have shown that the invention enables the loop to be obtained precisely with the required circumferential extension, i.e., neither with an excessively abundant length (which might disturb the subsequent inserting operation of the winding into the slots of a stator of an alternator), nor with a length smaller than the theoretical one (which might give rise to an undesired tension on the wire in the subsequent winding operation).

Figure 10:
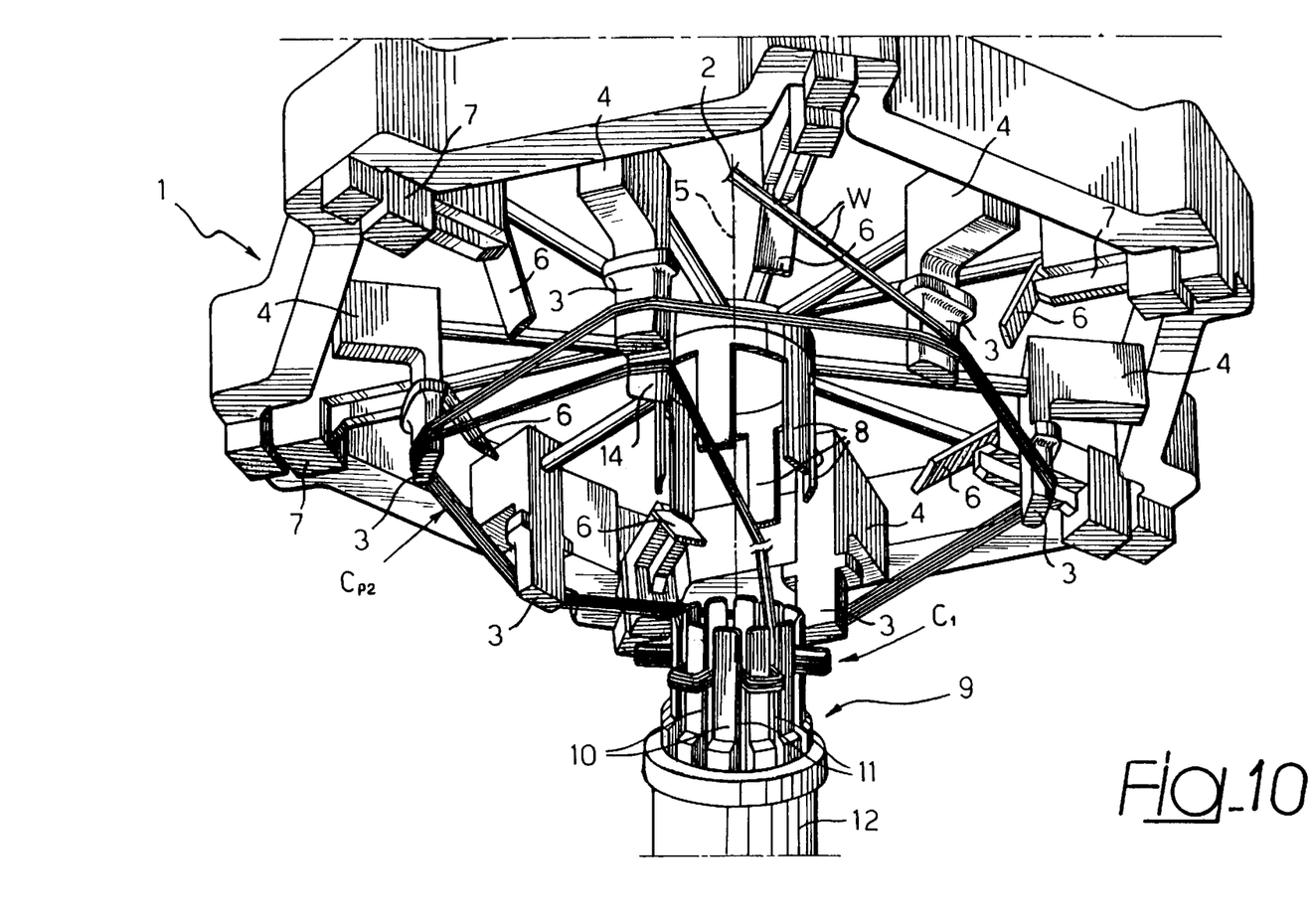
FIG. 10 is a perspective view from below of a rotating unit forming part of the apparatus according to the invention, where the device for receiving the multi-lobed coils formed on the rotating unit is also shown.
Figure 11:
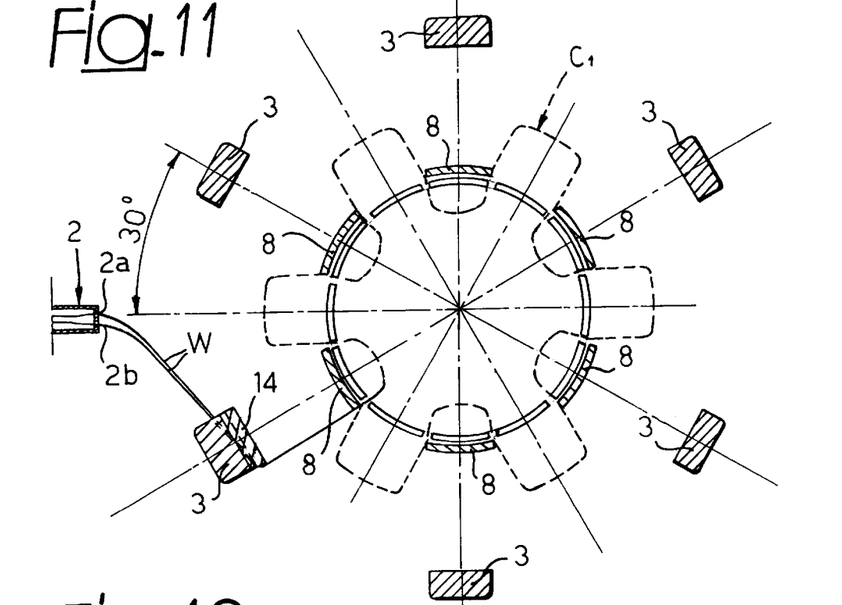
FIGS. 11 and 12 are diagrammatic plan views of the apparatus at two different stages of the forming operation of the multi-lobed winding according to the invention.
Figure 12:
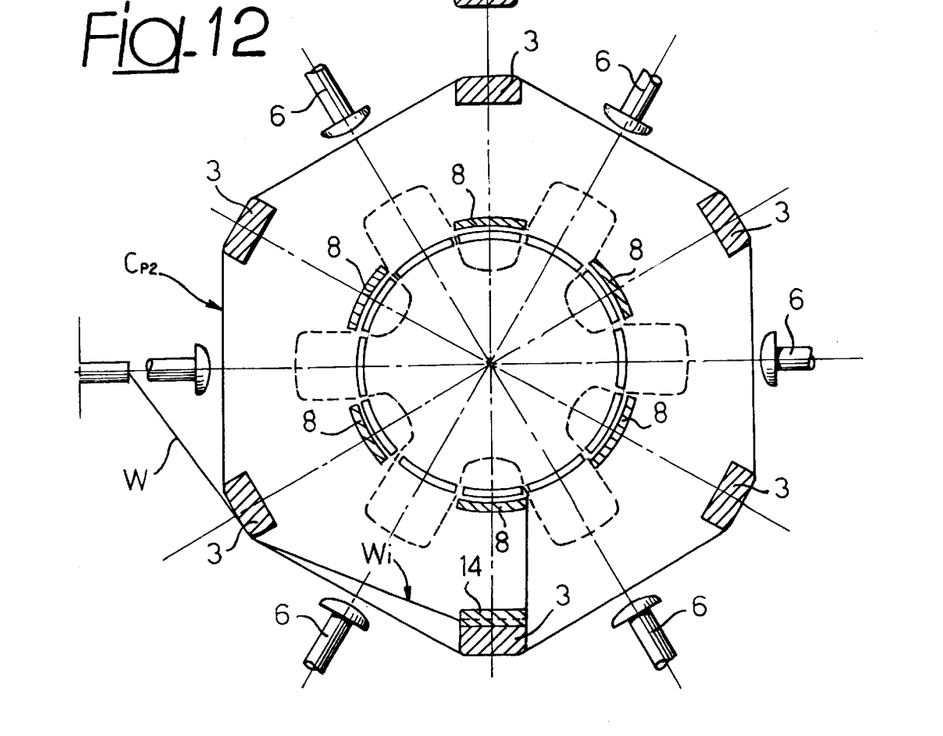

FIGS. 10, 11 and 12 are identical (except for the features which will be described in the following) to FIGS. 1, 4 and 5 so that the description thereof will not be repeated herein in detail. In the following, only the differences of the apparatus according to the present embodiment relative to the apparatus of FIGS. 1–9 will be described.

FIG. 10 differs from FIG. 1 in that the wire engaging element 14 (on which the loop E is formed when the wire reverses its winding direction) comprises a plate screwed to the radial inner surface of one of the forming elements 3, rather than being fixed to one of the fixed blades 8 carried by the rotating unit 1. This feature is also visible in FIGS. 11 and 12. These figures are similar, as indicated, to FIGS. 4 and 5. FIGS. 11 and 12 respectively show diagrammatically the apparatus in a plan view after winding the first coil and after the beginning of the winding in the opposite direction of the second coil. As already discussed, apart from this difference, the structure and the operation of the apparatus are similar to that described in connection with FIGS. 1–9.

Figure 13:
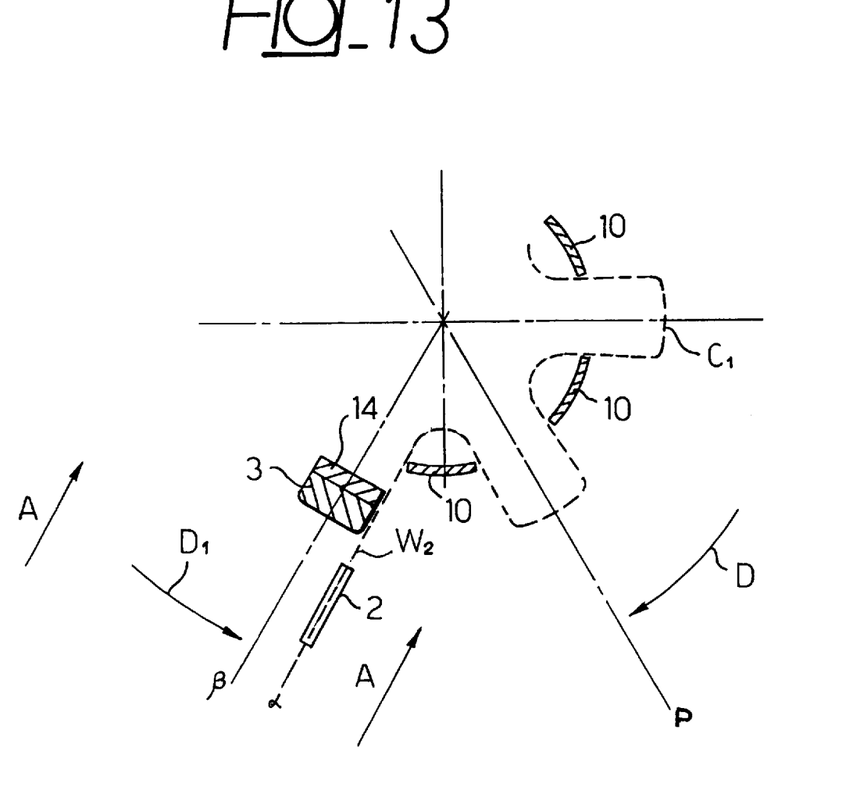
FIG. 13 is a partial diagrammatic plan view of the apparatus.
Figure 14:
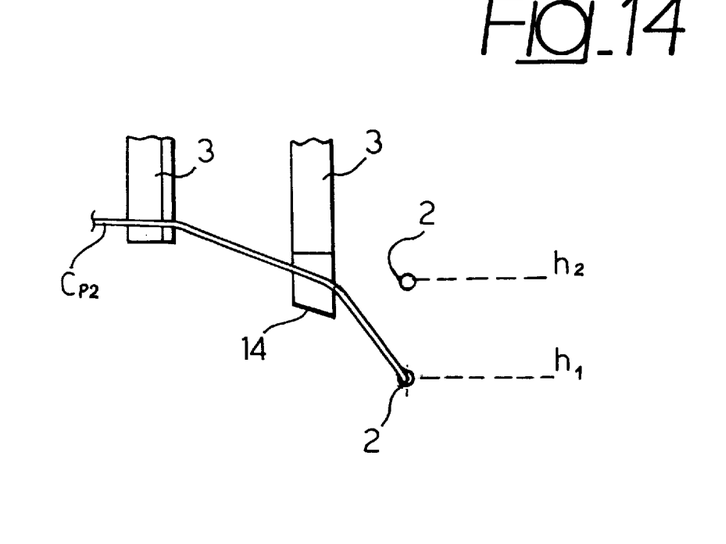
FIG. 14 is a partial view of the apparatus of FIG. 13 along A—A at a different stage of the forming operation of the multi-lobed winding.

The operation of the wire engaging element 14 will be described with greater particularity with reference to FIGS. 13 and 14. FIG. 13 is a partial diagrammatic plan view of the apparatus. It should be noted that, for purposes of clarity, forming element 3 and wire engaging element 14 are shown radially closer to the center of the rotating unit 1 then they would be in actual practice. FIG. 14 is a partial view of the apparatus of FIG. 13 along A—A at a different stage of the forming operation of the multi-lobed winding.

As shown in FIG. 13, the first multi-lobed coil $C_1$ has been inserted on the blades 10 of the inserting tool 9 with the wire lead $W_z$ extending to the delivery tube 2 at angular position α. When the first multi-lobed coil $C_1$ is deposited on the inserting tool 9, forming element 3 and wire engaging element 14 (wire engaging element 14 is connected to one of the forming elements 3, as shown in FIGS. 13 and 14) are in position P. Position P corresponds to the lobe of the first multi-lobed coil $C_1$ immediately to the right of the delivery tube 2, as shown in FIG. 13. During the deposit of the first multi-lobed coil $C_1$ on the inserting tool 9, rotating unit 1 is lowered and delivery tube 2 reaches its lowest level $h_1$ (as shown in FIG. 14). Lowering the rotating unit 1 facilitates deposit while lowering the delivery tube 2 prevents the wire lead $W_z$ from becoming too long.

After the deposit of the first multi-lobed coil $C_1$ on the inserting tool 9, rotating unit 1 and delivery tube 2 are raised (in order that wire engaging element 14 does not catch wire lead $W_z$) and rotated in direction D such that forming element 3 and wire engaging element 14 are at angular position β. As shown in FIG. 14, the tip of wire engaging element 14 preferably slopes downward (in direction D) to further decrease the chance of wire engaging element 14 catching wire lead $W_z$ during the rotation in direction D to angular position β. Once at angular position β, rotating unit 1 and delivery tube 2 are lowered toward the inserting tool 9 and rotated in direction $D_1$ until wire engaging element 14 engages wire lead $W_z$.

After wire engaging element 14 engages wire lead $W_z$, rotating unit 1 and the inserting tool 9 start to rotate in synchronism in direction $D_1$ to form the second polygonal coil $C_{P2}$. At about this time (i.e., about when the synchronized rotation starts), rotating unit 1 rises away from the inserting tool 9. The delivery tube 2 must also rise (to level $h_2$, as shown in FIG. 14) in order to cause the wire of the second polygonal coil $C_{P2}$ to engage forming elements 3 (which are higher than wire engaging element 14).

Tests show that, due to the above indicated difference, the apparatus according to the present embodiment is able to provide a winding in which the loop formed by the wire where the wire reverses its winding direction has a circumferential extension which substantially corresponds to the desired theoretical one, or at most slightly greater (to avoid any inconvenience both during the forming operation of the coil and during the following inserting operation of the winding into the slots of the stator of an alternator).

Merely by way of example, FIG. 10 shows the application of the apparatus to the case in which two wires are simultaneously wound on the rotating unit 1. This technique, known in the art, provides for the use of a wire feeding delivery tube 2 to which two separate wires W are fed from separate supplying reels and reach the rotating unit by passing through two separate holes 2a, 2b (FIG. 11) of the feeding device 2, which keep them spaced apart from each other by a given length. Naturally, the apparatus according to the present invention may also be used with a feeding device which feeds a single wire.

The invention is applicable both to the case in which a single wire is wound on the rotating unit, and to the case, corresponding to a known technique, in which two wires are simultaneously fed by the feeding device which are simultaneously wound on the rotating unit, as shown in FIG. 10, for example.

Naturally, while the principles of the invention remains the same, the details of construction and the embodiments may widely vary with respect to what has been described and illustrated, without departing from the scope of the present invention.

In particular, the invention has been applied to a machine of the type shown in Italian patent 1,157,040, and in parallel U.S. Pat. No. 4,512,376, merely by way of example. At present, machines for forming undulatory coils are being used which are also of a type different from that forming the subject of these prior patents and the principles which are at the basis of the present invention are equally applicable also to this type of machine. One skilled in the art will therefore appreciate that the present invention can be practiced by other than the described embodiments, which are presented for purposes of illustration and not of limitation, and that the present invention is limited only by the claims which follow.

I claim:

1. Apparatus for forming a multi-lobed winding, the winding having a plurality of radial lobes alternated with hollows, the apparatus comprising:

a rotating unit for winding a wire to form a polygonal coil;

pushing members carried by the rotating unit to push sides of the polygonal coil radially inward to form the multi-lobed winding; and a receiving tool that rotates substantially synchronously with the rotating unit to receive the multi-lobed winding.

2. The apparatus of claim 1 wherein the rotating unit winds the wire to form a second polygonal coil axially superimposed on the first multi-lobed winding without cutting the wire.

3. The apparatus of claim 2 wherein the rotation of the rotating unit reverses to wind the wire to form a second polygonal coil.

4. The apparatus of claim 3 wherein the receiving tool is rotated such that the second multi-lobed winding is formed angularly shifted relative to the first multi-lobed winding.

5. The apparatus of claim 3 wherein the rotating unit includes a wire engaging element that intercepts the wire to form a loop when rotation of the rotating unit is reversed.

6. The apparatus of claim 5 wherein the loop follows an annular path matching the profile of one of the two windings for one part and the profile of the other winding for another part.

7. A method of forming a multi-lobed winding, the winding having a plurality of radial lobes alternated with hollows, the method comprising:

forming a polygonal coil with a rotating unit;

pushing sides of the polygonal coil radially inward to form the multi-lobed winding; and discharging the multi-lobed winding on a receiving tool that rotates substantially synchronously with the rotating unit.

8. The method of claim 7 further comprising forming a second multi-lobed winding axially superimposed on the first winding without cutting the wire between the first and second windings.

9. The method of claim 7 further comprising forming a second multi-lobed winding axially superimposed on and angularly shifted relative to the first winding without cutting the wire between the first and second windings.

10. The method of claim 7 further comprising winding the wire with the rotating unit in a direction opposite the winding of the first polygonal coil to form a second polygonal coil without cutting the wire between the first and second coils.

11. The method of claim 10 further comprising bending the wire where the wire reverses its winding direction to form a loop following an annular path matching the profile of one of the two windings for one part and the profile of the other winding for another part.

* * * * *